Jan. 14, 1941.                I. WARNER                2,228,618
        PROCESS OF BURNING MATERIAL OF THE CLASS CONSISTING
              OF CARBONATES OF CALCIUM AND MAGNESIUM
                        Filed Nov. 3, 1939
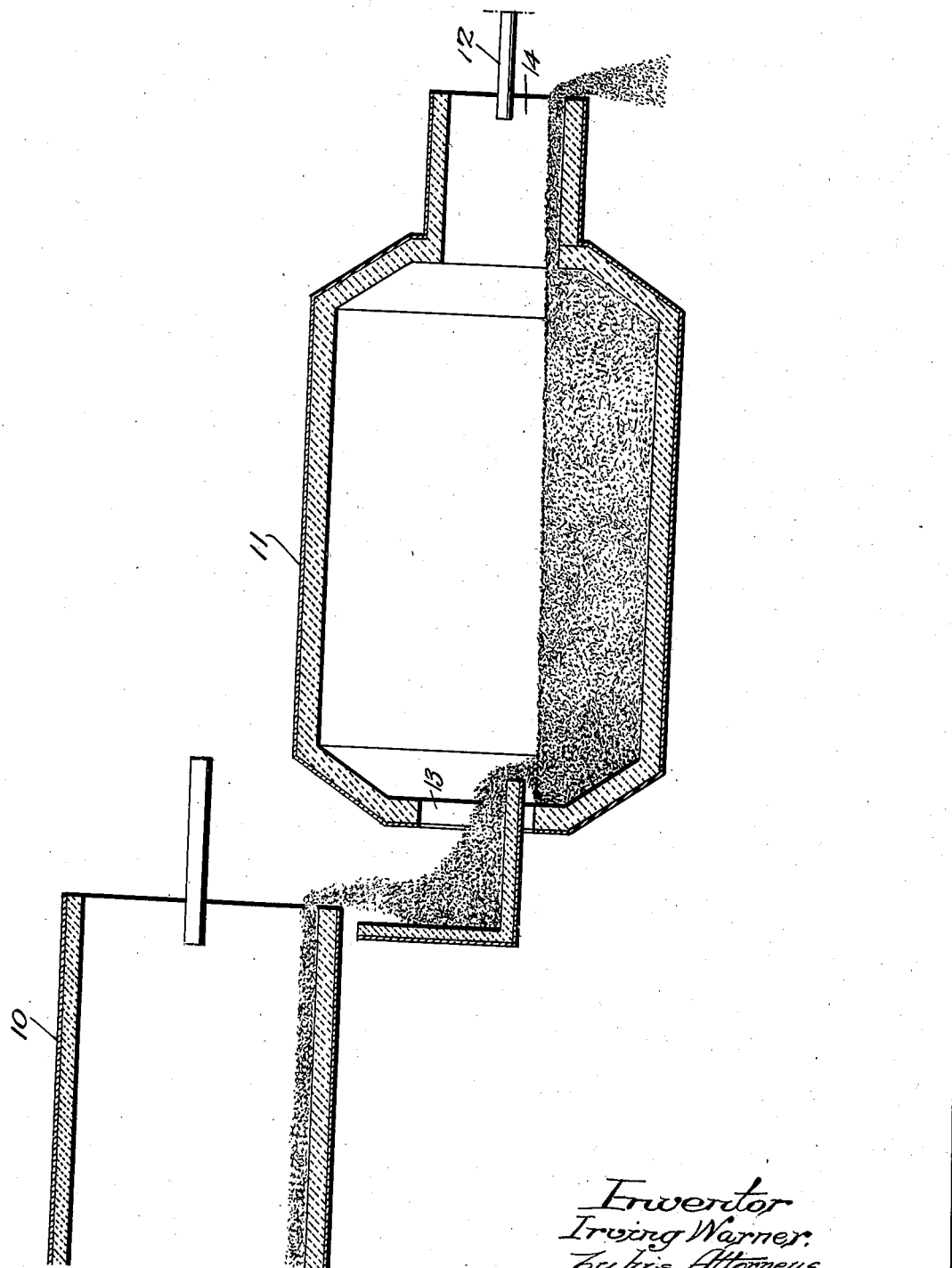
Inventor
Irving Warner
by his Attorneys
Howson & Howson

UNITED STATES PATENT OFFICE 2,228,618

PROCESS OF BURNING MATERIAL OF THE CLASS CONSISTING OF CARBONATES OF CALCIUM AND MAGNESIUM

Irving Warner, Wilmington, Del., assignor to Warner Company, Philadelphia, Pa., a corporation of Delaware Application November 3, 1939, Serial No. 302,793

3 Claims. (Cl. 263—53)

This invention relates to improvements in the burning of material of the class consisting of carbonates of calcium and magnesium to produce the oxide thereof, and has for an important object the provision of a process of calcining such carbonates in which the danger of injury ot the oxide from overburning is eliminated while at the same time permitting production of a completely calcined product.

The process of the present invention is applicable to the calcination of any natural or industrial product in which the calcium or magnesium is present as the carbonate. Since the most abundant source of the carbonates is the naturally occurring carbonate rock, the process will be described using such a naturally occurring carbonate as the material to be treated. The naturally occurring carbonates include the high calcium limestones where the magnesium carbonate content is low, for example, 5 per cent. or less, the magnesium limestones where the ratio of CaO to MgO is in the approximate molar ratio of 1; and the calcarious and relatively pure magnesites where the ratio of MgO to CaO is relatively large.

The calcination of material of the class consisting of the carbonates of calcium and magnesium is highly endothermic. The presence of undecomposed carbonate in a piece of ore is very protective in preventing the temperature of the entire piece from rising to the high temperature existing in the furnace. As little at 1 per cent. $CO_2$ present as the carbonate is found to be protective; whereas, a completely calcined particle would quickly be overburnt in the temperatures commonly employed in calcination by rotary kilns. In the process of the present invention, the protective action of undecomposed carbonate in the ore being calcined is relied upon to prevent hard burning thereof.

The invention hereinafter will be described using high calcium limestone as the material calcined, but it is to be understood that the other material of the class consisting of the carbonates of calcium and magnesium may be treated in a similar manner. As is well known, the critical temperature varies with the ore treated, and in any particular case, for optimum results, the amount of undecomposed carbonate serving as a protective agent against overburning may vary somewhat from the figures given herein for limestone.

It is accepted practice in the operation of rotary kilns for the calcination of limestone, to grade the stone feed within close limits. The run of the crusher producing the feed may be divided into as many as three or four different gradings. Even with this procedure, there is considerable variation in the size of the particles in any one grading. Hence, certain particles are more readily calcined than others. This condition is further aggravated by varying shapes of particles, some offering a proportionately greater area to the heat for a given mass.

Hard burning results from an incipient fusion between the lime and its contained impurities or between the lime and the refractory lining or between lime and the ash in the fuel. This hard burning takes place at a temperature above what may be termed the critical temperature of any given lime. The critical temperature of a lime is herein defined as the temperature above which a completely calcined lime will be injured by overburning in a reasonably short time, say in one hour or less. Below the critical temperature, the completely calcined lime would be uninjured for any reasonably practical time of exposure such as two hours or less. Time is obviously a function; that is, a long exposure of the material at a low temperature might effect the same injury as a short exposure at a high temperature.

The critical temperature varies for different limes. An impure lime will have a comparatively low critical temperature, and a pure lime, a high critical temperature. It is to be noted that, of the various impurities contained in limes, iron and alumina have considerably more tendency to reduce the critical temperature than silica. As an example, a lime containing silica 1.3 per cent. and iron and alumina 0.8 per cent. has a critical temperature of about 2100° to 2200° F., with a time factor of about two hours. Such a lime, if completely calcined, will be seriously injured if subjected to the usual kiln temperature of 2700° F., for as short a period as twenty minutes.

It is obvious, therefore, that in the usual commercial practice of calcining lime by a rotary kiln, it is very difficult to produce completely calcined lime without overburning a portion of the material in process. My invention, which overcomes this difficulty, consists of what is best defined as a two-stage calcination, and may be conveniently carried out by use of the apparatus illustrated in the accompanying drawing. In the main or primary kiln 10, a high furnace temperature is maintained, thus securing the rapid transfer of heat from the flame to the charge necessary to efficient production. The lime is discharged from this main kiln to the secondary calciner 11 before it is completely calcined so that it is uninjured by this high temperature.

In the secondary calciner 11, a furnace temperature is maintained, as by burner 12, which is less than the critical temperature of the lime in process. It is desirable that the lime be retained in this secondary calciner for not less than 30 minutes nor more than 2 hours. A period of one hour gives excellent results.

Since it is necessary to constantly agitate the charge in the secondary calciner in order to expose new surfaces to the furnace temperature and to intermingle the mass of the charge for uniform heat and temperature distribution, it is found that the best secondary calciner consists of a short rotary kiln of large diameter with restricted inlet and discharge openings 13 and 14 so that it can retain a sufficiently large mass to give the desirable finish calcination of about one hour.

In place of the rotary kilns illustrated in the drawing, any other suitable type, for example the Allentown grate or angle-of-rest kiln, may be employed either as the primary or secondary kiln. Furthermore, in place of burning the fuel in the kilns, other sources of heat may be used, such as electricity. Since the secondary calcination is carried out at a comparatively moderate temperature, electric heat may be used to especial advantage, in which case the effluent gas ($CO_2$) contains no products of combustion and is thus a valuable by-product.

The lime should be discharged from the primary or main kiln 10 containing not less than 1 per cent. $CO_2$ present as calcium carbonate nor more than 10 per cent. $CO_2$ present as calcium carbonate, that is from 2 per cent. to 22 per cent. of undecomposed carbonate. If there is less than 1 per cent. $CO_2$, insufficient endothermic protection is afforded against the high furnace temperature of the primary kiln. With an excess of $CO_2$, too much work is required of the secondary calciner. I find that best results are obtained if the lime discharged from the main kiln contains from 2 per cent. to 5 per cent. $CO_2$.

In the carrying out of my process a preponderant proportion of the calcination is done in the primary kiln which thereby requires most of the heat input. In practice it is found that not less than 90 per cent. of the heat input goes to the main kiln and only 5 per cent. to 10 per cent. of the total heat input goes to the secondary calciner. In accordance with this process, lime may be completely calcined with a continuous discharge of the partially calcined lime from the primary kiln, and no injury will result thereto.

Since, obviously, the critical temperatures of different stones will vary considerably, and treating times are a factor in determining the critical temperature, the temperatures given above must be considered only as examples and not as limiting. It is important, however, that the lime at all times be discharged from the primary kiln with the protective $CaCO_3$ content as outlined above.

I claim:

1. The process of calcining material of the class consisting of calcium and magnesium carbonates comprising heating the carbonate in a primary kiln at a temperature which would result in a hard burned product if the ore were completely calcined, discharging the product from said primary kiln after a preponderant portion of the calcination has taken place but before calcination is complete, and substantially completing the calcination of the product in a secondary kiln wherein the temperature is lower than that which results in a hard burned product.

2. The process of calcining limestone comprising heating the limestone in a primary kiln at a temperature which would result in a hard burned product if the ore were completely calcined, discharging the product from said primary kiln after the $CO_2$ content thereof present as carbonate is reduced to between one and ten per cent., and substantially completing the calcination of the product in a secondary kiln wherein the temperature is lower than that which results in a hard burned product.

3. The process of claim 2 wherein the $CO_2$ content of the product discharged from the primary kiln is between 2 per cent. and 5 per cent.

IRVING WARNER.